US009299087B1

(12) United States Patent  (10) Patent No.: US 9,299,087 B1
Barnes et al.  (45) Date of Patent: Mar. 29, 2016

(54) PROVIDING AND TRACKING VIRTUAL COUPONS

(75) Inventors: James D. Barnes, Overland Park, KS (US); Peter H. Distler, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1850 days.

(21) Appl. No.: 12/017,167

(22) Filed: Jan. 21, 2008

(51) Int. Cl.
*G06Q 30/00* (2012.01)
*G06Q 30/02* (2012.01)

(52) U.S. Cl.
CPC .................................. *G06Q 30/0261* (2013.01)

(58) Field of Classification Search
USPC .......... 705/14.49, 14.58, 14.53, 14.64, 14.66, 705/14; 455/456.1, 456.6
See application file for complete search history.

(56) References Cited

U.S. PATENT DOCUMENTS

| | | | |
|---|---|---|---|
| 6,249,252 B1 * | 6/2001 | Dupray | G01S 1/028 342/357.29 |
| 6,332,127 B1 * | 12/2001 | Bandera et al. | 705/14.55 |
| 6,405,044 B1 * | 6/2002 | Smith | H04W 16/02 370/329 |
| 6,449,486 B1 * | 9/2002 | Rao | G01S 5/0027 342/352 |
| 6,505,046 B1 * | 1/2003 | Baker | G06Q 30/02 455/456.3 |
| 6,760,582 B2 * | 7/2004 | Gaal | G01S 19/05 342/165 |
| 6,801,778 B2 * | 10/2004 | Koorapaty | G01S 5/14 342/357.64 |
| 6,847,823 B2 * | 1/2005 | Lehikoinen | G06Q 30/0241 455/456.1 |
| 6,862,575 B1 * | 3/2005 | Anttila | G06Q 30/02 705/14.14 |
| 6,961,367 B2 | 11/2005 | Simic et al. | |
| 7,092,722 B1 * | 8/2006 | Oh | H04W 36/18 370/331 |
| 7,240,843 B2 * | 7/2007 | Paul | G06Q 20/341 235/383 |
| 7,343,317 B2 * | 3/2008 | Jokinen | G06Q 30/02 370/328 |
| 7,376,430 B2 * | 5/2008 | Matsuda | G01S 5/0263 455/456.1 |
| 7,400,884 B2 * | 7/2008 | Fok | G01S 5/0009 455/414.2 |
| 7,933,895 B2 * | 4/2011 | Amjadi | G06F 17/30864 705/14.1 |
| 7,945,271 B1 * | 5/2011 | Barnes | H04W 64/00 455/115.3 |
| 8,010,134 B2 * | 8/2011 | Barnes | G06Q 30/0259 455/404.2 |
| 8,239,286 B2 * | 8/2012 | Davis | G06Q 20/3224 705/14.15 |
| 2002/0086680 A1 | 7/2002 | Hunzinger | |
| 2002/0095333 A1 * | 7/2002 | Jokinen et al. | 705/14 |
| 2003/0008668 A1 | 1/2003 | Perez-Breva et al. | |
| 2003/0065805 A1 | 4/2003 | Barnes, Jr. | |
| 2004/0137886 A1 * | 7/2004 | Ross | G06Q 30/02 455/414.1 |
| 2004/0140361 A1 * | 7/2004 | Paul et al. | 235/462.45 |
| 2004/0198386 A1 | 10/2004 | Dupray | |
| 2004/0243519 A1 | 12/2004 | Perttila et al. | |
| 2005/0192024 A1 | 9/2005 | Sheynblat | |
| 2006/0089153 A1 | 4/2006 | Sheynblat | |
| 2006/0178932 A1 * | 8/2006 | Lang | 705/14 |
| 2007/0161380 A1 | 7/2007 | Fok et al. | |
| 2007/0162341 A1 * | 7/2007 | McConnell et al. | 705/14 |
| 2007/0174259 A1 * | 7/2007 | Amjadi | 707/3 |
| 2008/0004888 A1 * | 1/2008 | Davis et al. | 705/1 |
| 2008/0010114 A1 | 1/2008 | Head | |
| 2008/0119206 A1 | 5/2008 | Shalmon et al. | |
| 2008/0154715 A1 * | 6/2008 | Galinos | 705/14 |
| 2008/0227467 A1 | 9/2008 | Barnes et al. | |

* cited by examiner

FOREIGN PATENT DOCUMENTS

WO   WO 2008112401 A1 *  9/2008  ......... G06Q 30/0259

OTHER PUBLICATIONS

Lightningcast, Inc., "Lightningcast Mobile Video Advertising Solution," May 2, 2005.

*Primary Examiner* — Luis A Brown (57) ABSTRACT

A method is disclosed for providing and tracking virtual coupons. A proxy for a virtual coupon is provided to a mobile device. The virtual coupon is provided to the mobile device based on a set of conditions in response to a request made via the proxy for the virtual coupon, wherein the request comprises context information. The virtual coupon is deleted in response to an event.

13 Claims, 5 Drawing Sheets

Fig. 1

| | COUPONS | LOCATION OF REQUEST | TIME OF REQUEST | MOBILE DEVICE IDENTIFIER |
|---|---|---|---|---|
| 212 | | | | |
| 214 | BOOK STORE COUPON | B.T.S. #1844 SECTORS ALPHA AND BETA | 3:03:29 PM 02-05-2006 | 18365472901 |
| 216 | PIZZA RESTAURANT COUPON | LATITUDE 42° 35' N LONGITUDE 83° 01' W | 8:06:41 PM 02-04-2006 | 18365472901 |
| | COFFEE RESTAURANT COUPON | LATITUDE 42° 25' N LONGITUDE 83° 01' W | 8:00:00 AM 02-03-2006 | 90725436181 |

PROVIDING AND TRACKING VIRTUAL COUPONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

In marketing, a coupon is a ticket or document that can be exchanged for a financial discount, rebate, or other value related to goods or services. Customarily, coupons are issued by manufacturers of consumer packaged goods or by retailers, to be used in retail stores as a part of sales promotions. Coupons are often widely distributed through mail, magazines, newspapers and computer networks. Coupons distributed via computer networks have become popular because there is no postal cost and any printing cost is borne by the user, who may print the coupons, rather than the retailers issuing them.

Online retailers often refer to their coupons as "coupon codes," "promotional codes," "promotion codes," "discount codes," "key codes," "promo codes," "shopping codes," "voucher codes" or "source codes." Such virtual coupons typically provide for reduced cost or free shipping, a specific dollar or percentage discount, or some other offer to encourage consumers to purchase specific products or to purchase from specific retailers.

SUMMARY

In some embodiments, a method is provided for providing and tracking virtual coupons. A proxy for a virtual coupon is provided to a mobile device. The virtual coupon is provided to the mobile device based on a set of conditions in response to a request made via the proxy for the virtual coupon, wherein the request comprises context information. The virtual coupon is deleted in response to an event.

In other embodiments, a system is provided for providing and tracking virtual coupons. The system includes a server to provide a proxy for a virtual coupon to a mobile device. The server also provides the virtual coupon to the mobile device based on a set of conditions in response to a request made via the proxy for the virtual coupon, wherein the request comprises context information. Additionally, the server promotes deletion of the virtual coupon in response to an event.

In still other embodiments, a method is disclosed for providing and tracking virtual coupons. A proxy for a virtual coupon is provided to a mobile device. A location associated with the proxy is established. Whether the location is a redemption location is determined. Whether the proxy is at the redemption location is reported in response to determining that the location is the redemption location. The virtual coupon is provided to the mobile device based on a set of conditions in response to a request made via the proxy for the virtual coupon, wherein the request comprises context information. The virtual coupon is deleted in response to an event.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In embodiments of the present disclosure, methods and systems are provided for providing and tracking virtual coupons. Retailers often accumulate virtual coupons offered for redemption at a number of stores over a period of time and present these virtual coupons to the coupon provider for redemption. The coupon provider may be unable to determine the effectiveness of a virtual coupon in encouraging customers to visit locations associated with the coupon provider's goods or services because the coupon provider may not be able to track the usage patterns of virtual coupon users, such as which stores were visited and at what times.

In embodiments of the present disclosure, when a mobile device user responds to an advertisement for a virtual coupon, a server may provide a proxy for the virtual coupon to a mobile device. The proxy enables the mobile device to display general redemption information about the virtual coupon, but the proxy does not include everything required for redeeming the virtual coupon. Because a mobile device user may respond to the advertisement for the virtual coupon at any time and at any place, and may subsequently wait any amount of time before attempting to redeem the virtual coupon, providing the virtual coupon in response to the advertisement response may limit the ability to track the effectiveness of the virtual coupon. Therefore, the server initially provides the proxy to the mobile device, and subsequently provides the virtual coupon to the mobile device in response to a redemption request made via the proxy. The redemption request comprises context information, such as the time of the request and the location associated with the mobile device when the request was made. By providing virtual coupons in response to redemption requests, the server is able to track when and where the mobile device user requested to redeem the virtual coupon and without the need to support a separate information stream from a point of sale device. The server may analyze the context information to determine whether to provide the virtual coupon based on a set of conditions, such as a time or a place where the virtual coupon is valid. Additionally, the server may modify the value of the virtual coupon based on the time and location of the redemption request. The mobile device may delete the virtual coupon in response to an event, such as an expiration of time. The time expiration may encourage the mobile device user to redeem the virtual coupon shortly after requesting redemption, which insures the accuracy of the context information analyzed for tracking usage patterns.

In some embodiments, the mobile device may establish a location associated with the proxy, such as determining where the mobile device is located following receipt of the proxy. Either the mobile device or the server may determine whether the current location of the mobile device, and therefore the proxy, is a redemption location for the virtual coupon associated with the proxy. If the proxy is at a redemption location, either the mobile device or the server reports this information. The server may analyze such reports to determine the usage patterns of mobile device users who have a proxy on their mobile device even before the user requests redemption of a virtual coupon. These reports may be analyzed to determine how long a mobile device user waited after receiving the proxy before visiting a redemption location and how often the user visited the location before requesting virtual coupon redemption, which may indicate the effectiveness of the promotion using the virtual coupon.

The server may analyze the effectiveness of virtual coupons to determine which virtual coupon promotions may be cancelled, which virtual coupon promotions may be modified, and which virtual coupon promotions may be continued unmodified. The server may also analyze usage patterns of a specific mobile device user to determine which virtual coupon promotions to offer to the specific mobile device user. Furthermore, analysis of the usage patterns based on identifiers of the mobile device users may indicate which groups of mobile device users responded more positively to specific virtual coupons, such as groups based on gender, age, and income levels. Additionally, coupling the server to a point of sale device or processing payment through the mobile device may enable the server to analyze total sales information associated with the redemption of a type of virtual coupon to determine whether or not mobile device users are also purchasing full price goods or services along with the coupon-discounted goods or services.

Figure 1:
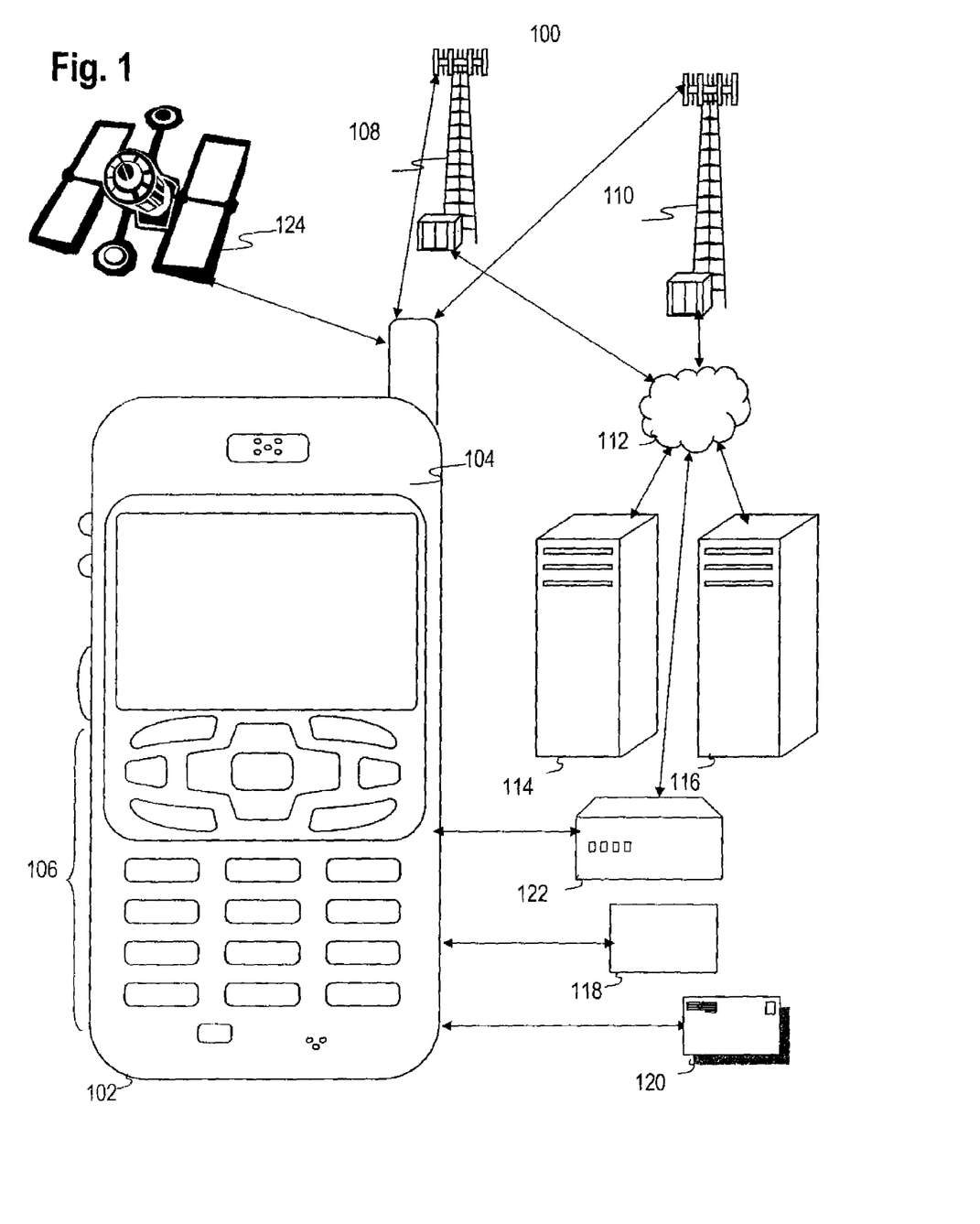
FIG. 1 shows an illustrative wireless communications system for providing and tracking virtual coupons according to some embodiments of the present disclosure.

FIG. 1 shows a wireless communications system 100 that illustrates the context for the systems and methods of the present disclosure. The wireless communication system 100 includes an illustrative mobile device 102. Though illustrated as a mobile phone, the mobile device 102 may take various forms including a personal digital assistant (PDA), a mobile computer, a digital camera, and a digital music player. Many suitable mobile devices combine some or all of these functions.

The mobile device 102 includes a display 104 and a touch-sensitive surface or keys 106 with which to interact with a user. The mobile device 102 may present options for the user to select, controls for the user to actuate, and/or cursors or other indicators for the user to direct. The mobile device 102 may further accept data entry from the user, including numbers to dial or various parameter values for configuring the operation of the mobile device 102. The mobile device 102 may further execute one or more software or firmware applications in response to user commands. These applications may configure the mobile device 102 to perform various customized functions in response to user interaction, including web browsing and viewing of information associated with virtual coupons.

In the illustrative system 100, the mobile device 102 communicates through either a first base transceiver station 108 or a second base transceiver station 110 and through a wired or wireless network 112 to access information on various servers, such as a server 114 and a coupon server 116. While two base transceiver stations are shown in FIG. 1, other base transceiver stations could be present. The server 114 may provide content that may be shown on the display 104. The coupon server 116 can store a proxy 118 for a coupon 120, the coupon 120, a location associated with either the proxy 118 or a request for the coupon 120, a corresponding time for the proxy 118 or the request, and a unique identifier for the mobile device 102. The proxy 118 may enable the mobile device 102 to display information that identifies a provider of the coupon 120, to which products or services the coupon 120 applies, which retailers honor the coupon 120, and the benefits associated with using the coupon 120.

The mobile device 102 can determine the location of the mobile device 102 following receipt of the proxy 118. The mobile device 102 can also determine a location of the mobile device 102 before it requests the coupon 120, when it requests the coupon 120, periodically, or at other times such as when a user uses the mobile device 102. The mobile device 102 can also store the location for the mobile device 102 on the mobile device 102 and/or communicate the location to the coupon server 116. For example, the mobile device 102 may establish the location of the mobile device 102 based on a radio frequency fingerprint, which is a set of wireless signals, such as base transceiver station signals and cell sector signals, received by an antenna and front end unit from a wireless communication network and converted to baseband by a radio frequency transceiver. No additional consumption of time or resources is required for the mobile device 102 to determine a radio frequency fingerprint because the mobile device 102 already determines radio frequency fingerprints on a periodic basis to determine if the mobile device 102 will switch from communicating with one base transceiver station to communicating with another base transceiver station. The mobile device 102 may establish its location based on an identity of the base transceiver station 108 contained in the radio frequency fingerprint.

A request for the coupon 120 can also include a unique identifier for the mobile device 102 that determined the location. For example, a mobile identification number (MIN) refers to a 10-digit unique number that a wireless operator uses to identify a mobile phone. An equipment identity (EID) alternatively may be used to identify the mobile device 102.

A retailer can issue the coupon 120 via the network 112. The user of the mobile device 102 can use a web browser on the mobile device 102 to download the coupon 120. If the retailer that issued the coupon restricts downloading of the coupon to mobile devices 102 at specified locations, the mobile device 102 may determine a location of the mobile device 102 and may verify that the location matches the location specified for downloading by the retailer before downloading the coupon 120.

The mobile device 102 may communicate the coupon 120 to a point of sale device 122, which may be located in a store of the retailer that issued the coupon 120. For example, when the user of the mobile device 102 purchases a book at a book store, the mobile device 102 communicates the coupon 120 to the point of sale device 122 at the book store.

Additionally, the mobile device 102 may communicate with a global positioning satellite (GPS) 124 to determine the location of the mobile device 102, but such a determination may involve more system overhead and may be less reliable for indoor environments typical at redemption. Furthermore, the mobile device 102 may communicate with the first base transceiver station 108 and the second base transceiver station 110 to determine the location of the mobile device 102, but such a determination may also involve more system overhead than a location determination based on a radio frequency fingerprint. While one content server and one coupon server are shown in FIG. 1, other servers could be present. The server 114 and the coupon server 116 communicate with the mobile device 102 through the network 112 and either the first base transceiver station 108 or the second base transceiver station 110 by a standard wireless telephony protocol (such as code division multiple access (CDMA), global system for mobile communications (GSM), worldwide interoperability for microwave access (WiMAX), and universal mobile telecommunication system (UMTS)), a wireless internet connection, or some other means of wireless communication. Although the server 114 and the coupon server 116 are depicted separately in FIG. 1, the functions of the server 114 and the functions of the coupon server 116 can be combined on one server.

Figure 2:
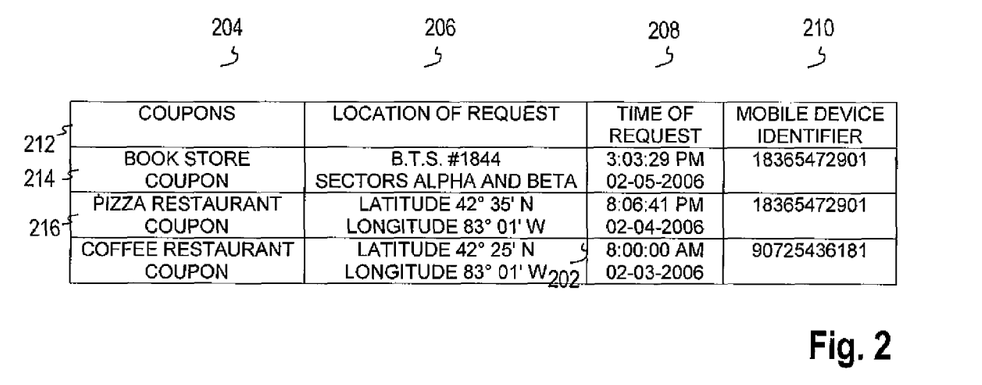
FIG. 2 shows data for providing and tracking virtual coupons according to some embodiments of the present disclosure.

FIG. 2 shows a block diagram of the request data 202 for providing and tracking virtual coupons according to some embodiments of the present disclosure. The request data 202 includes a coupons column 204, a location of request column 206, a time of request column 208, and a mobile device identifier column 210. The coupons column 204 includes an identifier for each coupon, such as a book store coupon 212, a pizza restaurant coupon 214, and a coffee restaurant coupon 216.

For example, "base transceiver station #1844 sectors alpha and beta" is listed in the book store coupon 212 row under the location of request column 206. The data shown for the book store coupon 212 indicates that the mobile device 102 receives information from the first base transceiver station 108, which can be identified by a base transceiver station identifier, such as #1844. Most base transceiver stations broadcast using multiple cell sectors, typically three that are labeled alpha, beta, and gamma. Cell sectors are sub-regions of a coverage area for a base transceiver station, but because cell sectors change dynamically based on usage requirements, cell sectors do not necessarily identify specific geographical locations. Each cell sector signal may include multiple frequencies, such as 10 frequencies per cell sector region. The data for the book store coupon 212 indicates that the mobile device 102 receives information from the alpha sector and the beta sector for the first base transceiver station 108, but not from the gamma sector for the first base transceiver station 108.

The time of request column 208 lists "3:03:29 PM on Feb. 5, 2006" as the time in the book store coupon 212 row. This time is associated with the request for the book store coupon because it indicates the time the radio frequency fingerprint was determined for the book store coupon 212.

The mobile device identifier column 210 lists "18365472901" as the identifier of the mobile device 102 that determined the radio frequency fingerprint in the book store coupon 212 row. This mobile device identifier 210 is associated with the book store coupon 212 because it uniquely identifies the mobile device 102 that determined the radio frequency fingerprint for the book store coupon 212.

Additionally, the data for the coupons can include base transceiver station signal amplitude, base transceiver station signal phase, cell sector frequencies, and pseudo noise phase measurement data. The mobile device 102 detects the pseudo noise phase measurement data broadcast by transmitting base transceiver stations. Depending on variables such as processor power, available battery power, accuracy required, and the tolerance for false alarms, the mobile device 102 can detect very small increments of movement by the mobile device 102 by tracking the phase shifts of the pseudo noise phase measurement data.

In the pizza restaurant coupon 214 row, the location of request column 206 lists latitude 42 degrees 35 minutes north and longitude 83 degrees and 1 minute west. The data shown for the pizza restaurant coupon 214 may indicate that a global positioning system (GPS) sensor determined the longitude and the attitude of the mobile device 102 that is associated with the request for the pizza restaurant coupon 214. In an embodiment, the GPS coordinates may indicate latitude and longitude in finer increments, for example including seconds and fractions of seconds.

Figure 3:
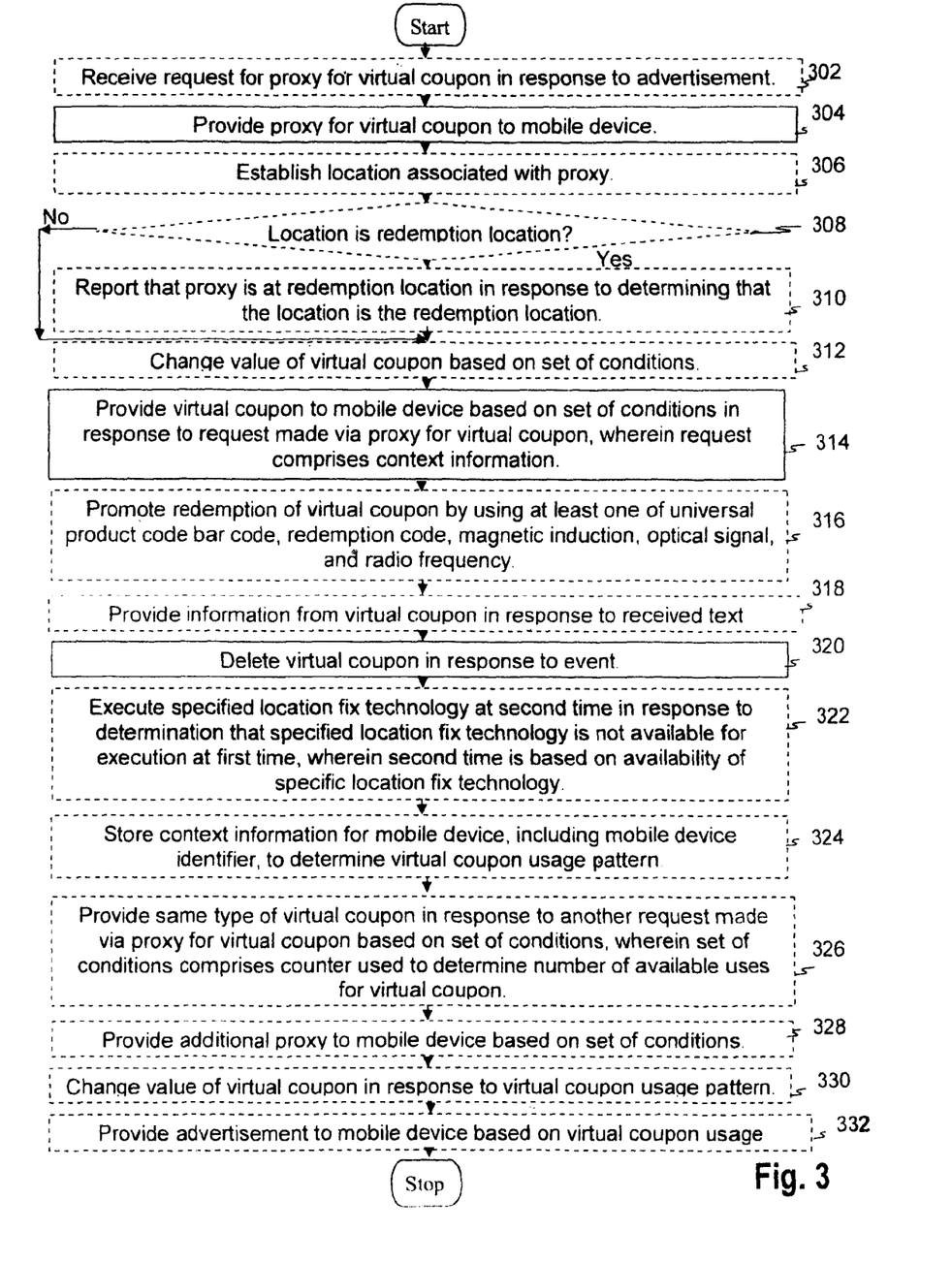
FIG. 3 shows a flowchart of a method for providing and tracking virtual coupons according to some embodiments of the present disclosure.

FIG. 3 is a flowchart illustrating a method for providing and tracking virtual coupons according to some embodiments of the present disclosure. The mobile device 102 can use the method to provide virtual coupons to mobile devices and track the locations and times associated with the virtual coupons and the mobile devices.

In box 302, a request for the proxy is optionally received in response to an advertisement. For example, the coupon server 116 receives a request for the proxy 118 in response to a book store advertisement displayed on the mobile device 102. Although the mobile device user may perceive the response to the book store advertisement as a request for the book store coupon 212, the response is actually a request for the proxy 118 associated with the book store coupon 212. The proxy 118 is missing at least one key element which thereby prevents it from being completely processed as a coupon.

In box 304, a proxy for a virtual coupon is provided to a mobile device. For example, the coupon server 116 provides the proxy 118 for the book store coupon 212 to the mobile device 102 in response to a request for the proxy 118. The mobile device 102 may store the proxy 118 in a memory and/or in a virtual wallet.

In box 306, a location associated with the proxy is optionally established. For example, the mobile device 102 determines a radio frequency fingerprint when the mobile device 102 that received the proxy 118 is at a book store. The radio frequency fingerprint determined at the book store includes base transceiver station data and cell sector data based on the signals that the mobile device 102 receives at the book store. The mobile device 102 may occasionally establish and store locations associated with the mobile device 102. Establishing a location associated with the mobile device 102 and the proxy 118 may be based on a radio frequency fingerprint or based on executing a location fix technology for an advanced forward link triangulation, a global positioning system, and/or a hybrid location fix technology, which are described below.

In box 308, whether the location is a redemption location is optionally determined. For example, the mobile device 102 determines whether the location of the mobile device 102 is a redemption location for the book store coupon 212. The proxy 118 may include a list of redemption locations, and the mobile device 102 may compare the established location of the mobile device 102 to the list to determine whether the established location of the mobile device 102 is one of the listed redemption locations. In another example, the mobile device 102 may communicate the established location of the mobile device 102 to the coupon server 116. The coupon server 116 may have a list of redemption locations, and compare the established location of the mobile device 102 to the list to determine whether the established location of the mobile device 102 is one of the listed redemption locations.

The mobile device 102 may determine that a radio frequency fingerprint establishes a location that matches the list of redemption locations if a degree of confidence score based on a comparison of the radio frequency fingerprint and another radio frequency fingerprint specified for redemption exceeds a threshold score. The mobile device 102 may use a degree of confidence score to determine matches because the signal strength from base transceiver stations is highly variable due to the amount of communication traffic and the time of the day, such that the mobile device 102 can determine slightly different radio frequency fingerprints over time even when the mobile device 102 is completely stationary. The base transceiver station closest to the mobile device 102 may become very busy, and reduce the base transceiver station signal strength accordingly. The radio frequency fingerprint for the mobile device 102 can include signals from a primary base transceiver station, which can indicate the longitude and the latitude of the primary base transceiver station, and signals from additional base transceiver stations. Furthermore, the radio frequency fingerprint can include multiple frequencies for each sector for each base transceiver station that is within range of the mobile device 102.

Therefore, the mobile device 102 executes an algorithm to produce a confidence score based on the likelihood that the radio frequency fingerprint is determined from the same location as any radio frequency fingerprint that is specified for redemption. For example, if the radio frequency fingerprint includes signals from four base transceiver stations, and the radio frequency fingerprints specified for redemption includes signals from the same four base transceiver stations and one additional base transceiver station, the algorithm can set the degree of confidence at 90%. If the mobile device 102 compares the 90% degree of confidence to a specified threshold score of 80%, the mobile device 102 can determine that the radio frequency fingerprint matches a radio frequency fingerprint specified for redemption. The threshold score can be set variably, such that the matching of only one common base transceiver station is sufficient, and can be based on a significant difference between the radio frequency fingerprint and the radio frequency fingerprints specified for redemption.

If the mobile device 102 determines that the location of the mobile device 102 is a redemption location for the book store coupon 212, the method continues to box 310. If the mobile device 102 determines that the location of the mobile device 102 is not a redemption location for the book store coupon 212, the method proceeds to box 312.

In box 310, it is optionally reported that the proxy is at the redemption location. For example, the mobile device 102 communicates with the coupon server 116 to report that the proxy 118 is at a redemption location associated with the book store coupon 212. In another example, the coupon server 116 reports that the established location communicated by the mobile device 102 matches one of the list of redemption locations associated with the book store coupon 212. The reports may be stored in the coupon server 116, stored in a data store associated with the coupon server 116, or communicated to a coupon provider. Reporting that the proxy 118 is at a redemption location associated with the coupon 120 provides additional information for customer usage patterns. For example, independent of when a user subsequently requested the book store coupon 212, such a report may indicate that the user who requested the proxy 118 for the book store coupon 212 visited a redemption location associated with the book store coupon 212 within seven days of the request for the proxy 118. In another example, independent of when a user subsequently requested the coffee restaurant coupon 216, such a report may indicate that the user who requested the proxy 118 for the coffee restaurant coupon 216 visited a redemption location associated with the coffee restaurant coupon 216 within two days of the request for the proxy 118. Such reports may indicate the effectiveness of various promotions at encouraging users to visit redemption locations, even before the users use the proxies 118 to request the coupons 120. Such reports may also indicate how often users return to a specific redemption location before requesting the coupon 120 for the specific redemption location.

In box 312, a value of the virtual coupon is optionally changed based on a set of conditions. For example, the coupon server 116 changes the redemption value of the book store coupon 212 based on the day of the week, such as a Thursday, when the book store coupon 212 is worth a 20% reduction in book prices instead of the regular 10% reduction. The set of conditions may also be based on a date, a time, a location, a number of available uses, a number of available uses at a specific location, and/or a number of available uses by the mobile device 102. For example, some coupons 120 may have a time-dependent value, such as an exponential or linear decay in value to encourage quick redemption, or a value pattern that correlates with service availability to encourage off-hour redemption. In one example, some coupons 120 may have location dependent values, such as different discounts at different store locations. In another example, some coupons 120 may be more valuable for first-time visitors. In yet another example, some coupons 120 may become more valuable if a mobile device user has visited a specific redemption location more than a specified number of times without requesting the coupon 120. In an additional example, some coupons 120 may have usage dependent values, such as a discount that increases with each use to converge to a predetermined limit.

In box 314, the virtual coupon is provided to the mobile device based on the set of conditions in response to a request made via the proxy for the virtual coupon, wherein the request comprises context information. For example, the coupon server 116 provides the book store coupon 212 to the mobile device 102 in response to a request made by the mobile device 102 via the proxy 118 for the book store coupon 212. The request for the book store coupon 212 includes context information, such as a time of the request and a location associated with the request. The coupon server 116 may compare the time and location associated with the request to a set of conditions for the book store coupon 212 to determine whether to provide the book store coupon 212 to the mobile device 102. For example, some coupons 120 may be valid only during pre-defined intervals, such as the first ten minutes of each hour, mornings, lunch hours, happy hours, specific weekdays, weekends, paydays, birthdays, holidays, the first week of a month, and specific shopping seasons. A restaurant coupon may on successive days apply towards a predetermined Monday special, a Tuesday special, a Wednesday special, etc. A travel services coupon may offer discounts to different destinations in different months. In one example, some coupons 120 may be valid only so long as the user of the mobile device 102 remains in a pre-determined location, such as a store or mall. In another example, some coupons 120 that are only valid for the mobile device user's next visit to a city may become valid and then expire unused once the mobile device 102 enters and leaves that city. In yet another example, some coupons 120 may be valid only in specific locations, such as specific stores or specific zip codes. In an additional example, some coupons 120 may be valid only for frequent customers. In one more example, some coupons 120 may be valid only after a specified number of uses, such as when every fifth carwash is free.

In box 316, redemption of the virtual coupon is optionally promoted by using at least one of a universal product code bar code, a redemption code, a magnetic induction, an optical signal, and a radio frequency. For example, the coupon 120 promotes redemption by using a bar code which may be scanned by a bar code reader at the point of sale. Additionally, the mobile device 102 may establish communications with the point of sale device 122 using magnetic induction, an optical signal, or a radio frequency. The mobile device 102 may transmit redemption information for the coupon 120 to the point of sale device 122. In some embodiments having two way communication, upon receiving an updated purchase total from the point of sale device 122 based on the value of the coupon 120, the mobile device 102 may consummate the transaction by providing electronic payment information to the point of sale device 122.

In box 318, information from the virtual coupon is optionally provided in a response to a received text message. For example, based on the pizza restaurant coupon 214, a user of the mobile device 102 telephones a pizza order to the restaurant and informs a restaurant worker about the pizza restaurant coupon 214. If the restaurant worker cannot confirm the pizza restaurant coupon 214 during the order, the restaurant worker may send a text message to the mobile device 102 for confirmation purposes. The mobile device 102 responds to the text message with a text message response that provides redemption information from the pizza restaurant coupon 214.

In box 320, the virtual coupon is deleted in response to an event. For example, the coupon 120 requests that the mobile device 102 delete the coupon 120 one hour after the coupon server 116 provides the coupon 120 to the mobile device 102. The coupon 120 may request that the mobile device 102 delete the coupon 120 within any time period, such as thirty minutes or five minutes. The process of deleting the coupon 120 may also result in deleting the proxy 118. The event may be a time expiration, a location change, a receipt of a point of sale device confirmation message, or a merchant action. The point of sale device confirmation message may include sale information, and the mobile device 102 may forward the sales information to the coupon server 116. In response to the mobile device 102 forwarding the sale information, which may include an itemization of products and services being purchased, the coupon server 116 may analyze the sale information to determine the effectiveness of the coupon 120. For example, the coupon server 116 may determine that the mobile device user used the book store coupon 212, which provides a 50% discount on the price of only one book, to purchase only one book, indicating that the user's visit to the book store did not generate any additional sales. Conversely, if the specific user purchased nine additional books at full price, the analysis may indicate that the book store coupon 212 was an effective promotion in regard to the specific user.

In box 322, a specified location fix technology is optionally executed at a second time in response to a determination that the specified location fix technology is not available for execution at a first time, wherein the second time is based on an availability of the specific location fix technology. For example, the mobile device 102 does not have GPS access to determine the location of the mobile device 102 when the mobile device 102 is requesting the book store coupon 212 at the book store. The proxy 118 includes a list of redemption locations, but the only currently available location fix technology, the radio frequency fingerprint technology, establishes a location for the mobile device 102 that matches multiple redemption locations. The mobile device 102 responds to the multiple location matches by including the radio frequency fingerprint as a preliminary location in the request for the book store coupon 212, and by periodically checking the availability of the GPS location fix technology. When the user takes the mobile device 102 outdoors, the GPS location fix technology is enabled, the mobile device 102 executes the GPS location fix technology, and the mobile device 102 communicates the GPS-based location to the coupon server 116. The coupon server 116 stores the GPS-based location in place of the preliminary location associated with the request for the book store coupon 212.

In box 324, context information for the mobile device, including a mobile device identifier, is optionally stored to determine virtual coupon usage patterns. For example, the coupon server 116 stores the location associated with the request for the coupon 120, the time of the request, and the unique identifier of the mobile device 102. For this example, the coupon server 116 previously stored the data listed in the location of request column 206, the time of request column 208, and the mobile device identifier column 210 for the coffee restaurant coupon 216 row. Usage patterns may include a count of visits and/or coupon requests for each redemption location and a measure of time spent at each redemption location. These usage patterns may indicate a mobile device user's frequency of visitation to a specific location and both the days and the times at which the user tends to visit the specific location, such as typically visiting a gas station on Monday and Friday mornings.

In box 326, a same type of the virtual coupon is optionally provided in response to another request made via the proxy for the virtual coupon based on the set of conditions, wherein the set of conditions comprise a virtual coupon counter used to determine a number of available uses for the virtual coupon. For example, the coupon server 116 includes a virtual coupon counter that determines the mobile device user's use of the book store coupon 212 is the first of a possible three uses. In response to determining that the mobile device user may use the book store coupon 212 on additional occasions, the coupon server 116 provides another proxy 118 for the book store coupon 212, even though the mobile device has just deleted both the proxy 118 for the book store coupon 212 and the book store coupon 212. Upon receipt of another request for the book store coupon 212, the coupon server 116 provides the book store coupon 212 to the mobile device 102 once again.

In box 328, an additional proxy is optionally provided to the mobile device based on the set of conditions. For example, because the mobile device user has totaled more than a specified amount of purchases at the book store, the coupon server 116 provides an additional proxy 118 for a rewards-based coupon to the mobile device 102.

In box 330, a value of the virtual coupon is optionally changed in response to a virtual coupon usage pattern. For example, the coupon server 116 determines that more customers are redeeming the pizza restaurant coupon 214 during the grand opening of the pizza restaurant than the restaurant can fill orders for. The coupon server 116 reduces the discount value of the pizza restaurant coupon 214, and provides an explanatory note, that is displayed to mobile devices users that receive the pizza restaurant coupon 214, that the discount value will be increased for coupon users who order on subsequent days.

In box 332, an advertisement is optionally provided to the mobile device based on a virtual coupon usage pattern. For example, the coupon server 116 analyzes the usage pattern for a mobile device user and determines that the user purchased nine additional books at full price each time the user redeemed a book store coupon 212 that has already been used the maximum number of times. In response to this analysis, the coupon server 116 provides an advertisement for a supplementary book store coupon 212 to the mobile device 102.

In some embodiments of the present disclosure, the mobile device 102 can execute a location fix technology to establish a location and use the location as described in FIG. 3. For example, the mobile device 102 can execute a radio frequency fingerprint technology, a global positioning system technology, an advanced forward link triangulation technology, or a hybrid location fix technology to establish the location of the mobile device 102. The mobile device 102 can establish a location periodically, such as determining and storing the radio frequency fingerprint once every minute. The mobile device 102 can determine and store a radio frequency fingerprint in the background without requiring significant time or resources for the mobile device 102 and the network 112.

The mobile device 102 can determine a radio frequency fingerprint for the mobile device 102 based on the user using the mobile device 102. If the user makes a call on the mobile device 102 or activates a web browser on the mobile device 102, the most recently stored radio frequency fingerprint may not have been determined recently. Because determining and storing a radio frequency fingerprint does not require significant time or resources for the mobile device 102 and the network 112, the user using the mobile device 102 may initiate determining and storing a new radio frequency fingerprint.

The mobile device 102 can determine a radio frequency fingerprint based an enablement of the global positioning system, such as when the mobile device 102 is moved from indoors to outdoors. The mobile device 102 can periodically check for global positioning system enablement based on the passage of time.

Global positioning system satellites transmit signals that are received by the mobile device 102. The mobile device 102 triangulates its position based on the different signals received from different satellites. The location accuracy is environment driven and dependant on the type of equipment used. The global positioning system technology is owned and operated by the U.S. Department of Defense, but is available for general use around the world. The global positioning system technology requires a direct line of sight between the mobile device 102 and four or more satellites to fix the location of the mobile device, such as when the mobile device 102 is outdoors. Although the global positioning system technology provides high accuracy location fixes, this technology often cannot provide location fixes for mobile devices 102 that are indoors. Because of the time and the battery power required to measure signals from multiple satellites and to triangulate the location fix, the mobile device 102 executes the global positioning system technology in background infrequently for periodic determinations of location fixes.

Furthermore, the mobile device 102 can use advanced forward link triangulation technology to determine its position based on the different radio frequency signals received from different base transceiver stations, such as the first base transceiver station 108 and the second base transceiver station 110.

Each serving base transceiver station broadcasts a system parameters information message to the mobile device 102. This message includes the longitude and the latitude of the serving base transceiver station. The radius covered by serving base transceiver stations vary greatly, from hundreds of meters in dense urban areas to 20 miles or more in rural environments.

The advanced forward link triangulation technology fixes the location of the mobile device 102 based on measurements taken of time and distance signals from nearby base transceiver stations. The mobile device 102 reports the time and distance measurements to the network 112, then the network 112 triangulates a location fix of the mobile device 102, and reports the location fix back to mobile device 102. In general, more than three surrounding base transceiver stations are required to triangulate an optimal location fix. Because of the time required to measure signals from multiple base transceiver stations, to report the measurements to the network 112, to triangulate the location fix, and to report the location fix back to the mobile device 102, the advanced forward link triangulation technology requires significant amounts of both time and resources from the mobile device 102 and the network 112. Therefore, although the advanced forward link triangulation technology determines high accuracy location fixes, the mobile device 102 executes the advanced forward link triangulation technology in background infrequently for periodic determinations of location fixes.

The mobile device 102 can use a hybrid technology to fix the location of the mobile device 102 based on a combination of other location fix technologies. For example, if the mobile device 102 is indoors, but close to a window, the global positioning system technology in combination with a base transceiver station location technology can calculate the location fix for the mobile device 102. When the mobile device 102 is indoors, the mobile device 102 may receive signals from an insufficient number of satellites to triangulate the position of the mobile device 102. However, the hybrid technology can combine the signals from the insufficient number of satellites with the base transceiver station location identified by the channel length modulation (CLM) to calculate a hybrid location fix for the mobile device 102.

Figure 4:
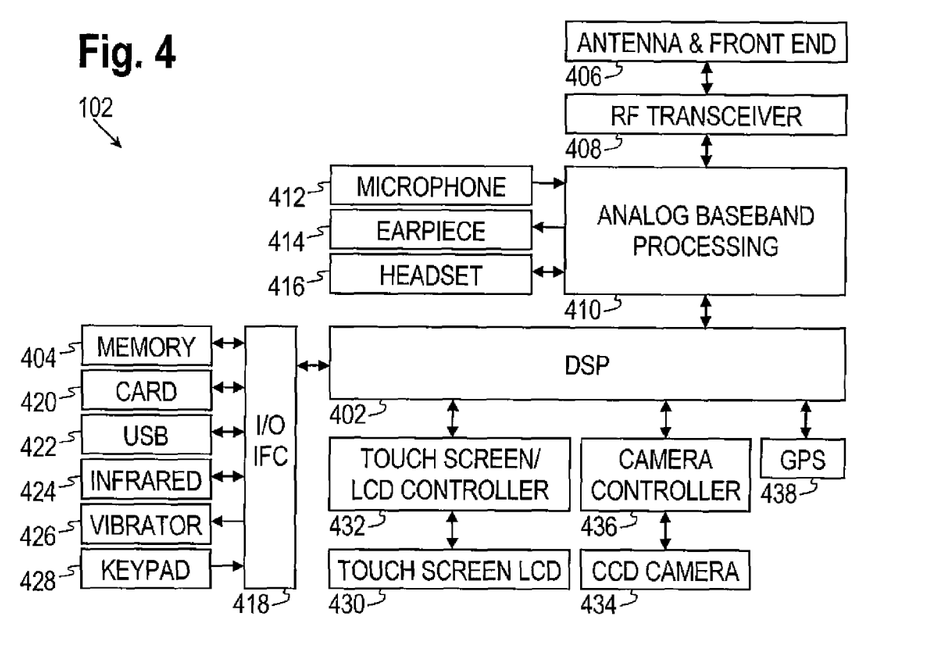
FIG. 4 shows a block diagram of an illustrative mobile device.

FIG. 4 shows a block diagram of the handset 102. While a variety of known components of handsets 102 are depicted, in an embodiment a subset of the listed components and/or additional components not listed may be included in the handset 102. The handset 102 includes a digital signal processor (DSP) 402 and a memory 404. As shown, the handset 102 may further include an antenna and front end unit 406, a radio frequency (RF) transceiver 408, an analog baseband processing unit 410, a microphone 412, an earpiece speaker 414, a headset port 416, an input/output interface 418, a removable memory card 420, a universal serial bus (USB) port 422, an infrared port 424, a vibrator 426, a keypad 428, a touch screen liquid crystal display (LCD) with a touch sensitive surface 430, a touch screen/LCD controller 432, a charge-coupled device (CCD) camera 434, a camera controller 436, and a global positioning system (GPS) sensor 438. In an embodiment, the handset 102 may include another kind of display that does not provide a touch sensitive screen. In an embodiment, the DSP 402 may communicate directly with the memory 404 without passing through the input/output interface 418.

The DSP 402 or some other form of controller or central processing unit operates to control the various components of the handset 102 in accordance with embedded software or firmware stored in memory 404 or stored in memory contained within the DSP 402 itself. In addition to the embedded software or firmware, the DSP 402 may execute other applications stored in the memory 404 or made available via information carrier media such as portable data storage media like the removable memory card 420 or via wired or wireless network communications. The application software may comprise a compiled set of machine-readable instructions that configure the DSP 402 to provide the desired functionality, or the application software may be high-level software instructions to be processed by an interpreter or compiler to indirectly configure the DSP 402.

The antenna and front end unit 406 may be provided to convert between wireless signals and electrical signals, enabling the handset 102 to send and receive information from a cellular network or some other available wireless communications network or from a peer handset 102. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 406 may include antenna tuning and/or impedance matching components, RF power amplifiers, and/or low noise amplifiers.

The RF transceiver 408 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 410 and/or the DSP 402 or other central processing unit. In some embodiments, the RF Transceiver 408, portions of the Antenna and Front End 406, and the analog baseband processing unit 410 may be combined in one or more processing units and/or application specific integrated circuits (ASICs).

The analog baseband processing unit 410 may provide various analog processing of inputs and outputs, for example analog processing of inputs from the microphone 412 and the headset 416 and outputs to the earpiece 414 and the headset 416. To that end, the analog baseband processing unit 410 may have ports for connecting to the built-in microphone 412 and the earpiece speaker 414 that enable the handset 102 to be used as a cell phone. The analog baseband processing unit 410 may further include a port for connecting to a headset or other hands-free microphone and speaker configuration. The analog baseband processing unit 410 may provide digital-to-analog conversion in one signal direction and analog-to-digital conversion in the opposing signal direction. In some embodiments, at least some of the functionality of the analog baseband processing unit 410 may be provided by digital processing components, for example by the DSP 402 or by other central processing units.

The DSP 402 may perform modulation/demodulation, coding/decoding, interleaving/deinterleaving, spreading/despreading, inverse fast fourier transforming (IFFT)/fast fourier transforming (FFT), cyclic prefix appending/removal, and other signal processing functions associated with wireless communications. In an embodiment, for example in a code division multiple access (CDMA) technology application, for a transmitter function the DSP 402 may perform modulation, coding, interleaving, and spreading, and for a receiver function the DSP 402 may perform despreading, deinterleaving, decoding, and demodulation. In another embodiment, for example in an orthogonal frequency division multiplex access (OFDMA) technology application, for the transmitter function the DSP 402 may perform modulation, coding, interleaving, inverse fast fourier transforming, and cyclic prefix appending, and for a receiver function the DSP 402 may perform cyclic prefix removal, fast fourier transforming, deinterleaving, decoding, and demodulation. In other wireless technology applications, yet other signal processing functions and combinations of signal processing functions may be performed by the DSP 402.

The DSP 402 may communicate with a wireless network via the analog baseband processing unit 410. In some embodiments, the communication may provide Internet connectivity, enabling a user to gain access to content on the Internet and to send and receive e-mail or text messages. The input/output interface 418 interconnects the DSP 402 and various memories and interfaces. The memory 404 and the removable memory card 420 may provide software and data to configure the operation of the DSP 402. Among the interfaces may be the USB interface 422 and the infrared port 424. The USB interface 422 may enable the handset 102 to function as a peripheral device to exchange information with a personal computer or other computer system. The infrared port 424 and other optional ports such as a Bluetooth interface or an IEEE 802.11 compliant wireless interface may enable the handset 102 to communicate wirelessly with other nearby handsets and/or wireless base stations.

The input/output interface 418 may further connect the DSP 402 to the vibrator 426 that, when triggered, causes the handset 102 to vibrate. The vibrator 426 may serve as a mechanism for silently alerting the user to any of various events such as an incoming call, a new text message, and an appointment reminder.

The keypad 428 couples to the DSP 402 via the interface 418 to provide one mechanism for the user to make selections, enter information, and otherwise provide input to the handset 102. Another input mechanism may be the touch screen LCD 430, which may also display text and/or graphics to the user. The touch screen LCD controller 432 couples the DSP 402 to the touch screen LCD 430.

The CCD camera 434 enables the handset 102 to take digital pictures. The DSP 402 communicates with the CCD camera 434 via the camera controller 436. The GPS sensor 438 is coupled to the DSP 402 to decode global positioning system signals, thereby enabling the handset 102 to determine its position. In another embodiment, a camera operating according to a technology other than Charge Coupled Device cameras may be employed. Various other peripherals may also be included to provide additional functions, e.g., radio and television reception.

Figure 5:
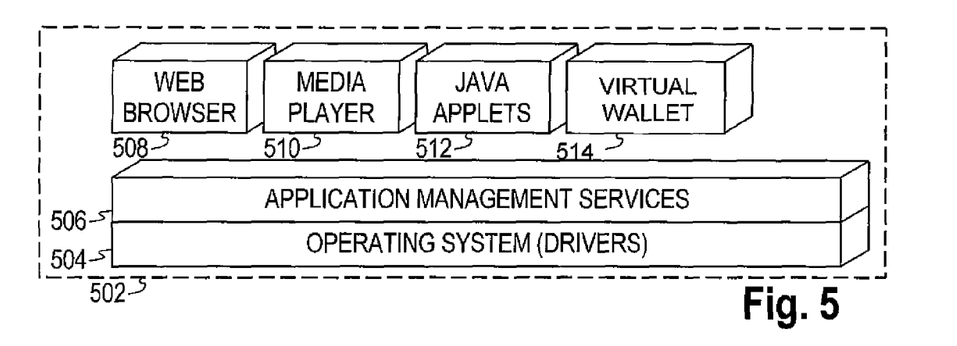
FIG. 5 shows a block diagram of an illustrative software configuration for a mobile device.

FIG. 5 illustrates a software environment 502 that may be implemented by the DSP 402. The DSP 402 executes operating system drivers 504 that provide a platform from which the rest of the software operates. The operating system drivers 504 provide drivers for the handset hardware with standardized interfaces that are accessible to application software. The operating system drivers 504 include application management services ("AMS") 506 that transfer control between applications running on the handset 102. Also shown in FIG. 5 are a web browser application 508, a media player application 510, JAVA applets 512, and a virtual wallet 514. The web browser application 508 configures the handset 102 to operate as a web browser, allowing a user to enter information into forms and select links to retrieve and view web pages. The media player application 510 configures the handset 102 to retrieve and play audio or audiovisual media. The JAVA applets 512 configure the handset 102 to provide games, utilities, and other functionality. The virtual wallet 514 may promote the storing of the proxy 118 and the coupon 120. The virtual wallet 514 may also promote displaying information associated with the proxy 118 and the coupon 120 on the mobile device 102. Additionally, the virtual wallet 514 may promote communicating with the point of sale device 122 to redeem the coupon 120.

Figure 6:
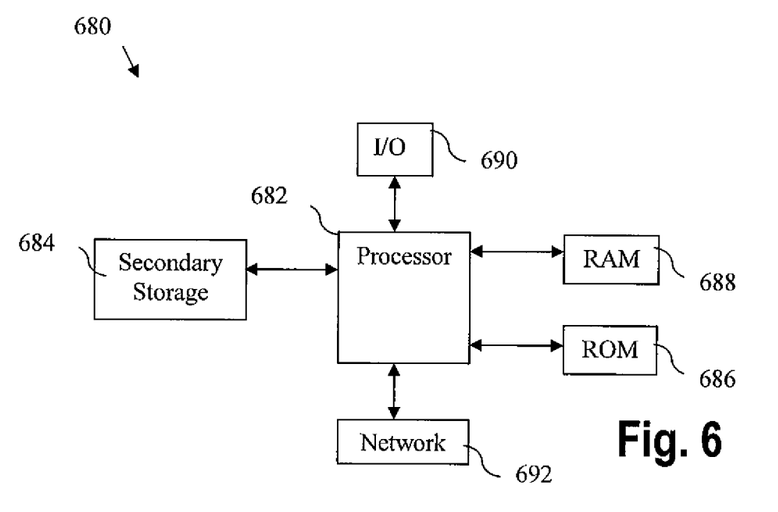
FIG. 6 illustrates an exemplary general purpose computer system suitable for implementing the several embodiments of the disclosure closure.

The system described above may be implemented on any general-purpose computer with sufficient processing power, memory resources, and network throughput capability to handle the necessary workload placed upon it. FIG. 6 illustrates a typical, general-purpose computer system, such as the server 114, suitable for implementing one or more embodiments disclosed herein. The computer system 680 includes a processor 682 (which may be referred to as a central processor unit or CPU) that is in communication with memory devices including secondary storage 684, read only memory (ROM) 686, random access memory (RAM) 688, input/output (I/O) devices 690, and network connectivity devices 692. The processor may be implemented as one or more CPU chips.

The secondary storage 684 is typically comprised of one or more disk drives or tape drives and is used for non-volatile storage of data and as an over-flow data storage device if RAM 688 is not large enough to hold all working data. Secondary storage 684 may be used to store programs which are loaded into RAM 688 when such programs are selected for execution. The ROM 686 is used to store instructions and perhaps data which are read during program execution. ROM 686 is a non-volatile memory device which typically has a small memory capacity relative to the larger memory capacity of secondary storage. The RAM 688 is used to store volatile data and perhaps to store instructions. Access to both ROM 686 and RAM 688 is typically faster than to secondary storage 684.

I/O devices 690 may include printers, video monitors, liquid crystal displays (LCDs), touch screen displays, keyboards, keypads, switches, dials, mice, track balls, voice recognizers, card readers, paper tape readers, or other well-known input devices. The network connectivity devices 692 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 692 may enable the processor 682 to communicate with an Internet or one or more intranets. With such a network connection, it is contemplated that the processor 682 might receive information from the network, or might output information to the network in the course of performing the above-described method steps. Such information, which is often represented as a sequence of instructions to be executed using processor 682, may be received from and outputted to the network, for example, in the form of a computer data signal embodied in a carrier wave.

Such information, which may include data or instructions to be executed using processor 682 for example, may be received from and outputted to the network, for example, in the form of a computer data baseband signal or signal embodied in a carrier wave. The baseband signal or signal embodied in the carrier wave generated by the network connectivity devices 692 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 682 executes instructions, codes, computer programs, scripts which it accesses from hard disk, floppy disk, optical disk (these various disk based systems may all be considered secondary storage 684), ROM 686, RAM 688, or the network connectivity devices 692. While only one processor 692 is shown, multiple processors may be present. Thus, while instructions may be discussed as executed by a processor, the instructions may be executed simultaneously, serially, or otherwise executed by one or multiple processors.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A computer implemented method for providing and tracking virtual coupons, comprising:
   receiving, by a coupon server, a request to provide a mobile device with a proxy for a virtual coupon, the proxy comprising redemption information associated with the virtual coupon;
   providing, by the coupon server, the proxy for the virtual coupon to the mobile device, wherein the virtual coupon is capable of redemption at one or more redemption locations;
   determining, by the mobile device, a location of the proxy provided to the mobile device by determining a location of the mobile device, wherein establishing the location of the proxy comprises executing a location fix technology for at least one of an advanced forward link triangulation, a global positioning system, and a hybrid location fix technology;
   subsequent to providing the proxy and prior to receiving a request for the virtual coupon, determining, by the mobile device, whether the location of the mobile device is the one or more redemption locations;
   sending, by the mobile device, a report indicating that the mobile device is at the one or more redemption locations in response to determining that the location of the mobile device is the one or more redemption locations;

in response to receiving the report and subsequent to providing the proxy, determining, by the coupon server, a usage pattern of a mobile device user of the mobile device by analyzing information including information in the report, the information including the one or more locations visited by the mobile device, the one or more redemption locations visited by the mobile device, and a time for each corresponding visit to the one or more locations and the one or more redemption locations;

subsequent to the sending of the report and determining the usage pattern, receiving the request for the virtual coupon from the mobile device, wherein the request is made via the proxy, wherein the request comprises context information that includes a location associated with the mobile device when the request was made;

in response to receiving the request:
   analyzing, by the coupon server, the usage pattern determined from the report to determine the virtual coupon and a virtual coupon value of the virtual coupon; and
   providing, by the coupon server, the virtual coupon to the mobile device based on a set of conditions comprising at least one of a date, a day in a week, a time, a location, a number of available uses, a number of available uses at a specific location, and a number of available uses by the mobile device, wherein the virtual coupon is redeemed at the one or more redemption locations; and promoting the mobile device to delete the virtual coupon in response to an event.

2. The computer implemented method of claim 1, further comprising:
   determining whether a specified location fix technology is available for execution at a first time; and
   executing a specified location fix technology at a second time in response to a determination that the specified location fix technology is not available for execution at the first time, wherein the second time is based on an availability of the specific location fix technology.

3. The computer implemented method of claim 1, wherein determining the usage pattern of the mobile device user comprises at least one of determining how long the mobile device user waited after receiving the proxy before visiting the one or more redemption locations, how often the mobile device user visited the one or more redemption locations before requesting the virtual coupon, how often the mobile device user returned to the one or more redemption locations before requesting the virtual coupon.

4. The computer implemented method of claim 1, wherein the proxy and the virtual coupon are associated with a promotion and further comprising determining, by the coupon server, the effectiveness of the promotion based on the determined usage pattern before receiving the request for the virtual coupon.

5. The computer implemented method of claim 1, further comprising changing the value of the virtual coupon based on the location associated with the mobile device when the request was made.

6. The computer implemented method of claim 1, further comprising providing an advertisement to the mobile device based on the determined usage pattern.

7. The computer implemented method of claim 1, wherein the proxy comprises information about the virtual coupon, but does not comprise everything required for redeeming the virtual coupon.

8. A system for providing and tracking virtual coupons, comprising:
   a mobile device configured to:
      receive a proxy for a virtual coupon from a coupon server, wherein the virtual coupon is capable of redemption at one or more redemption locations, and wherein the proxy comprises redemption information associated with the virtual coupon,
      determine a location of the proxy provided to the mobile device by determining a location of the mobile device, wherein establishing the location of the proxy comprises executing a location fix technology for at least one of an advanced forward link triangulation, a global positioning system, and a hybrid location fix technology,
      subsequent to providing the proxy and prior to sending a request for the virtual coupon, determine whether the location of the mobile device is the one or more redemption locations, and
      send a report indicating that the mobile device is at the one or more redemption locations in response to determining that the location of the mobile device is the one or more redemption locations, and
   the coupon server comprising a non-transitory memory and a processor, the virtual coupon server configured to:
      receive a request to provide the mobile device with the proxy for the virtual coupon,
      provide the proxy to the mobile device in response to the request for the proxy,
      in response to receiving the report and subsequent to providing the proxy, determine a usage pattern of a mobile device user of the mobile device by analyzing information including information in the report, the information including the one or more locations visited by the mobile device, the one or more redemption locations visited by the mobile device, and a time for each corresponding visit to the one or more locations and the one or more redemption locations,
      subsequent to the sending of the report and determining the usage pattern, receive the request for the virtual coupon from the mobile device, wherein the request is made via the proxy and comprises context information that includes a location associated with the mobile device when the request was made,
      in response to receiving the request:
         analyze the usage pattern determined from the report to determine the virtual coupon and a virtual coupon value of the virtual coupon, and
         provide the virtual coupon to the mobile device based on a set of conditions comprising at least one of a date, a day in a week, a time, a location, a number of available uses, a number of available uses at a specific location, and a number of available uses by the mobile device, wherein the virtual coupon is redeemed at the one or more redemption locations.

9. The system of claim 8, wherein determining the usage pattern of the mobile device user comprises at least one of determining how long the mobile device user waited after receiving the proxy before visiting the one or more redemption locations, how often the mobile device user visited the one or more redemption locations before requesting the virtual coupon, how often the mobile device user returned to the one or more redemption locations before requesting the virtual coupon.

10. The system of claim 8, wherein the proxy and the virtual coupon are associated with a promotion, and wherein the coupon server is further configured to determine the effectiveness of the promotion based on the determined usage pattern before receiving the request for the virtual coupon.

11. The system of claim 8, wherein the value of the virtual coupon is changed based on the location associated with the mobile device when the request was made.

12. The system of claim 8, wherein the coupon server is further configured to provide an advertisement to the mobile device based on the determined usage pattern.

13. The system of claim 8, wherein the proxy comprises information about the virtual coupon, but does not comprise everything required for redeeming the virtual coupon.

* * * * *